March 6, 1951 — C. G. MALIN — 2,544,099
CHILD'S CART
Filed July 2, 1946 — 2 Sheets-Sheet 1

INVENTOR
Chester G. Malin
BY Jesse P. Whann
ATTORNEY

March 6, 1951  C. G. MALIN  2,544,099
CHILD'S CART

Filed July 2, 1946  2 Sheets-Sheet 2

INVENTOR
Chester C. Malin
BY
Jesse P. Whann
ATTORNEY

Patented Mar. 6, 1951

2,544,099

UNITED STATES PATENT OFFICE 2,544,099

CHILD'S CART

Chester G. Malin, Glendale, Calif.

Application July 2, 1946, Serial No. 680,938

5 Claims. (Cl. 280—47)

My invention relates to carriages such as used for carting small children after they have passed the suckling infant age, and relates in particular to a cart for small children having a number of important features of utility whereby it is able to render especially valuable service to mothers who must take small children with them out upon the sidewalks and across streets.

There are a number of child's carts now available having a wheeled carriage portion providing a seat for the child, and a rearwardly and forwardly extending handle by which the child's vehicle is pushed along and maneuvered. These vehicles make little provision for the carrying of those accessories which must be kept handy for the care of infant children, and make no provision for the carrying of packages so that when the child is taken on a shopping tour the child's vehicle serves only as a means for conveniently transporting the child, but the parent or nurse is required to carry most of the packages obtained while shopping, although it is the practice to pile some of these packages in the child's vehicle.

An object of the present invention is to provide a child's cart having ample room therein in which the child is safely and conveniently carried, and also having a compartment for the carrying of accessories and/or articles other than the accessories, such as packages and bottles which must be carried home from a shopping tour.

A further object of the invention is to provide a child's cart of the general character described in the foregoing, which is of simple and economical construction, in which the child may occupy a standing, sitting or reclining position, this cart being stable so that it cannot be readily upset, and being so formed that the child cannot fall out when standing, but has unrestricted vision to the front and sides when sitting.

A further object of the invention is to provide a child's cart of this character having a chassis with a bottom and sides defining a compartment to receive the child and with a wall structure rearwardly of this compartment forming a compartment for the carrying of accessories and packages, and further to provide a hollow seat member which is slidable from the lower part of the accessories compartment into the child's compartment, thereby providing a seat for the child. The child's compartment is of such size that the child may sit either upon the floor thereof or may use the seat thus provided.

A further object of the invention is to provide in this child's cart means whereby the interior space of the retracted extensible seat is a continuation of the lower portion of the child's compartment into which the feet and portions of the legs of a child in reclining position may be extended when the child is lying upon the floor of the vehicle. Accordingly, this child's cart although extensively used for conveying the child when he is awake, makes provisions whereby he may sleep, lying upon the floor of the vehicle.

A further object of the invention is to provide in this child's cart a cooperation of elements whereby the moving of the seat member from retracted to extended position accomplishes an addition to the volume of the accessories and package compartment.

A further object of the invention is to provide as a part of the child's cart a removable basket which is detachably positioned upon the upper portion of the accessories compartment, this basket providing capacity for the transportation of a fairly large number of packages.

A further object of the invention is to provide this child's cart with a simple and effective means for adjusting the height of the handle and to support the handle so that it may be swung into a retracted position, thereby reducing the over all size of the cart. The adjustability of the height of the handle is of material importance. Child's carts are ordinarily made with handles of standard size and adjustment, and it is often necessary for a tall person to assume a stooping, unnatural position when wheeling such carts.

A further object of the invention is to provide a child's cart having means whereby certain dimensions of the cart may be changed as the child grows in height.

Further objects and advantages of the invention will be brought out in the following part of the specification.

Referring to the drawings, which are for illustrative purposes only:

Figures 1, 2:
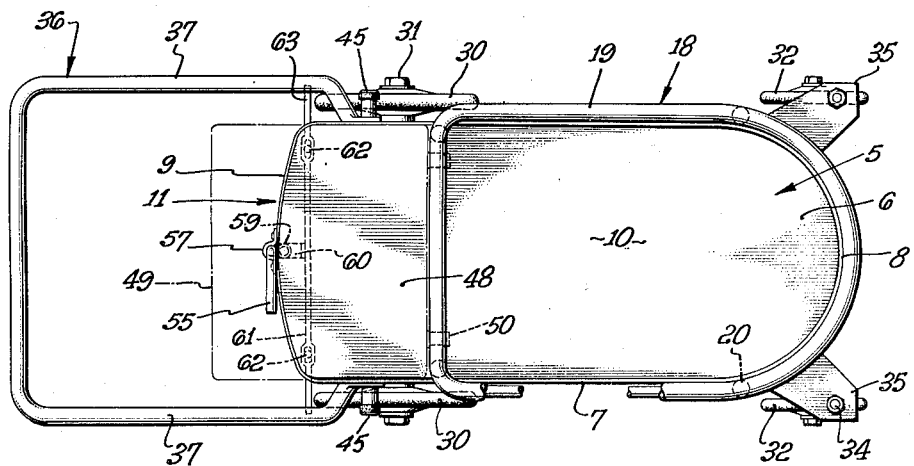
Fig. 1 is a plan view of a preferred embodiment of my invention.
Fig. 2 is a partly sectioned side elevation corresponding to Fig. 1.
Figure 3:
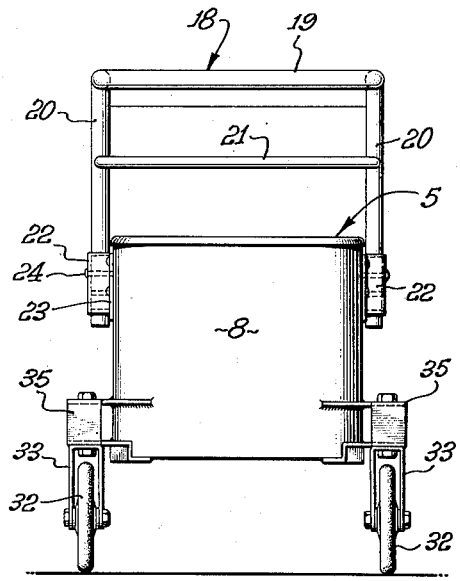
Fig. 3 is a front view of the child's cart.
Figure 4:
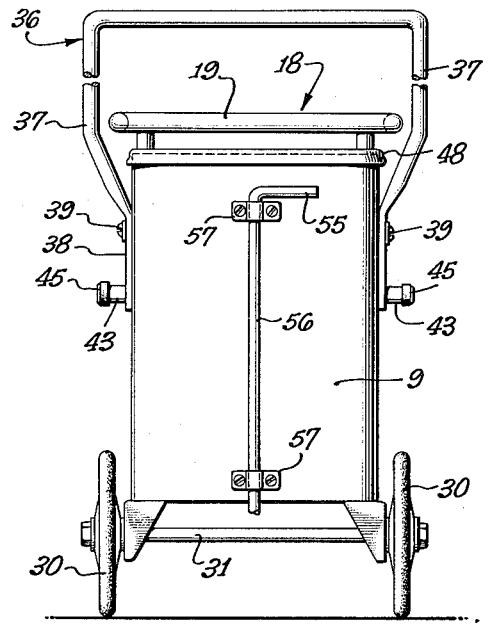
Fig. 4 is a rear view thereof with the upper portion of the handle removed; and, Fig. 5 is a perspective view of the detachable package-carrying basket.
Figure 5:
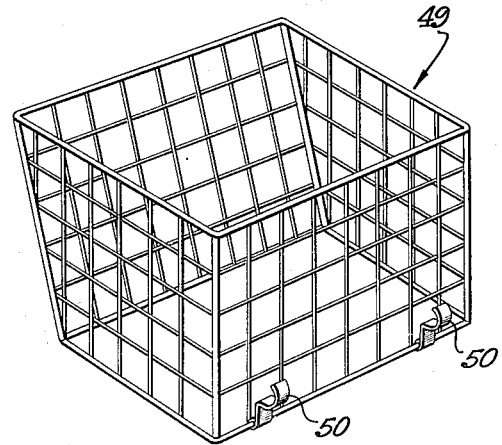

The child's cart includes a body 5 having a bottom wall 6 and a side wall 7, this side wall 7 having a front portion 8 and a rear portion 9, the front portion 8 of the side wall 7 defining a child's compartment 10, and the rear portion 9 of the side wall 7 extending above the level of the upper edge of the front portion 8 and defining an accessories compartment 11. The front portion 8 of the side wall extends around the front and along the two sides of the compartment and its height is such, for example about 10 in., that a child seated upon the floor of the compartment, formed by the bottom 6, may see out over the upper edge of the wall portion 8. The length and width of the child's compartment 10 are of such dimension that the compartment provides ample room for the child. For example, compartment 10 may be in the order of 12 in. or 14 in. wide and 18 in. to 20 in. long.

Between the upper portion of the accessories compartment 11 and the upper portion of the child's compartment 10 there is a vertical dividing or partition wall 12 which forms the front wall of the compartment above an opening 13' between the lower edge of the wall 12 and the bottom wall 6 connecting the compartments 10 and 11. In Fig. 2 I show in position retracted into the lower part of compartment 11, a seat member 13 which is of hollow construction and has a rectangular top wall 14 which constitutes the seat proper, a rear vertical wall 15 which extends from the rear edge of the top wall 14 to the bottom wall 6 and a pair of side walls 16 which are connected to the ends of the top and rear walls 14 and 15. When the seat member 13 is in the retracted position in which it is shown in full lines in Fig. 2 its interior space 17 constitutes an extension of the lower part of the front compartment 10. Accordingly, if the front to rear dimensions $d$ of the seat member 13 are in the neighborhood of 7 in., the entire length of the floor or bottom wall 6 exposed when the seat member 13 is retracted, will be in the order of 25 in. to 27 in.

When the seat member 13 is in its retracted position, its top wall 14 serves as an elevated bottom for the compartment 11, but when the seat member 13 is moved from retracted position to extended position 13'' in the rearward part of the child's compartment 10, the rear portion of the bottom wall 6 of the body will constitute the bottom of the compartment 11, and the rear wall 15 of the seat member 13 will be positioned substantially in alignment with the dividing wall 12.

The child's compartment 10 is provided with a guard element 18 having an upper rail 19 consisting of a lightweight metal tube bent into the form of a loop as shown in Fig. 1, tubular posts 20 which extend vertically downwardly from the rail 19, and a guard strip 21 which is secured to the posts 20 in a position between the rail 19 and the upper edge of the side wall portion 8. The lower ends of the posts 20 are slidably received in the tubular parts 22 of brackets 23 which are secured to the body 5. The lower extremities of the posts 20 project below the brackets 23, and the posts are secured against vertical movement in the brackets 23 by screws 24. The guard element 18 may be adjusted upwardly in the tubular posts 22 of the brackets 23 so as to raise the rail 19 relatively to the bottom 6 of the body 5. The guard element 18 is shown in Fig. 2 in its lowest position wherein the rail 19 is supported in a position near to shoulder height of a standing small infant, for example, 17 in. or 18 in. As the child grows, the guard element 18 may be raised so as to raise the level of the rail 19, removing the screws 24, sliding the posts 20 upwardly and relatively to the brackets 23 and reinserting the screws in selected openings 25 provided in the posts 20 for this purpose.

Figure 6:
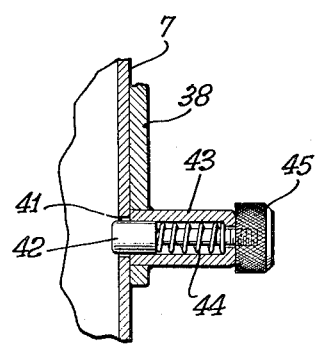
Fig. 6 is a fragmentary sectional view showing the locking pin for the push handle of the device.

The body 5 is supported on rear wheels 30, rotatable upon a transverse axle 31, and caster wheels 32 carried by caster brackets 33 which are rotatable upon the axes of substantially vertical pins 34 which project upward from the brackets 33 into supports 35 which are secured at the front corners of the body 5. A handle 36 is provided for the vehicle, this handle being of U-shaped form and having side portions 37, the lower ends 38 of which are flattened for engagement of the side wall 9 of the compartment 11. The handle is hinged on rivets 39 which extend through the upper parts of the flattened portions 38 and through the adjacent walls 9. The length of the side members of the handle 36 is such that the handle may be swung in forward direction from the position in which it is shown in full lines in Fig. 2 into retracted position shown by dotted lines 36', at which time the side members of the handle lie along the sides of the body 5. Below the rivets 39 the walls 9 have a number of openings 41 disposed on arcs around the centers of the rivets 39, to receive the inner ends of adjustable locking pins 42 which are disposed in the lower ends of the side member 37. As shown in Fig. 6, the locking pins 42 are slidable in tubes 43 which are mounted in the lower ends of the side members 37 and are provided with springs 44 for urging them into projecting relation. Knobs 45, at the outer ends of the pins 42, may be manually engaged so as to retract the pins 42 from the openings 41, thereby permitting the handle 36 to be swung through several different positions. Since the handle 36 is disposed in a sloping relation, the swinging of the handle will result in raising or lowering its upper end, to suit the requirements of the user. When the handle 36 is swung into retracted position as shown by dotted lines 36', the locking pins may engage openings 47 in the walls 9 to retain the handle in this retracted position. The accessories compartment 11 is equipped with a hinged cover 48, and the invention provides a supplementary luggage basket 49 which may be placed on the top of the cover 48 of the compartment 11, this luggage basket fitting between the side members 37 of the handle, as shown in Fig. 2, and having clips 50 for engaging the adjacent portions of the cart structure to hold the luggage basket in place on the top of the compartment 11.

A feature of the invention resides in the provision of a brake mechanism for the cart which does not require inconvenient stooping or kneeling of the operator. The brake mechanism has an actuating handle 55 disposed near the upper edge of the back wall of the compartment 11. This handle 55 is disposed at the upper end of a vertical bar or shaft 56 secured by vertically spaced bar members 57 so that it may be rotated through an angle of substantially 180°. At the lower end of the shaft 56 there is a crank pin 59 connected by a link 60 to the center of a transverse flexible brake bar 61. This brake bar 61 is connected by pivots, in the form of rivets 62 to the underside of the bottom wall 6 near the lateral extremity thereof. The ends 63 of the brake bar project laterally so as to lie across the tires of the rear wheels 30 of the brake bar 61. By means of the handle the shaft may be rotated, thereby swinging the crank pin, and, through the link, pulling the central portion of the brake bar rearwardly so that the opposite halves of the brake bar will swing around the rivets and the projecting ends of the brake bar will be pulled tightly into engagement with the tires of the wheel 30, thereby locking the wheels 30 against rotation. The brake bar is made of spring material so that it tends to straighten when the pulling force exerted through the link is released by reverse rotation of the handle, this straightening of the brake bar causing the end portion thereof to swing away from the tires of the wheels 30, thereby releasing the braking effect.

I claim:

1. In a child's cart of the character described, the combination of: a body having a bottom wall, a side wall structure extending upwardly therefrom so as to form a child's compartment, and a wall defining an accessories chamber rising above the upper edge of said side wall structure at one end of said compartment, there being a partition between said compartment and said chamber; an open work guard extending from the upper part of said accessories chamber around the upper edge of said side wall structure; supporting means secured in a position below said body, enabling it to be moved along a supporting surface; pivot means on the sides of the upper part of said accessories chamber; a handle swingable on said pivot means from an operative position projecting from said accessories chamber upwardly and over said body to a retracted position at the end of said cart opposite from said accessories chamber; and lock means for retaining said handle in said operative position.

2. In a child's cart of the character described, the combination of: a body having a continuous flat bottom wall and a side wall structure extending upwardly therefrom so as to form a child's compartment, and a partition wall defining an accessories chamber, at one end of said compartment, said side wall structure being of such height that a child standing on said bottom wall cannot fall out of said compartment, the lower portion of said partition stopping at a level spaced from said bottom wall to leave a space at the lower end of said accessories chamber in communication with said compartment, said space being a continuation of said compartment into which the legs of a child reclining on said bottom wall in said compartment may be extended; wheels for said body; a seat member; means supporting said seat member in a position projecting from the lower portion of said partition wall into said compartment and so that said seat may be retracted from said position; and a handle for the operation of said cart.

3. In a child's cart of the character described, the combination of: a body having a continuous flat bottom wall, a side wall structure extending upwardly therefrom so as to form a child's compartment, a wall defining an accessories chamber at one end of said compartment, and a dividing wall forming a partition between said compartment and said chamber, the lower portion of said dividing wall being spaced above said bottom wall so that there will be a space at the lower end of said accessories chamber in open communication with said compartment to receive a portion of the body of a child in said compartment; a seat; means supporting said seat in an operative position within said compartment and in a retracted position relative to said compartment when child is reclining in said compartment; supporting means secured to the lower part of said body, enabling it to be moved along a supporting surface; and a handle means for the child's cart for use in moving it.

4. In a child's cart of the character described, the combination of: a body having a continuous flat bottom wall, a side wall structure extending upwardly therefrom so as to form a child's compartment, a wall defining an accessories chamber at one end of said compartment, and a dividing wall forming a partition between said compartment and said chamber the lower portion of said dividing wall being spaced above said bottom so that there is a space at the lower end of said accessories chamber in open communication with said compartment; a seat in said compartment spaced above said bottom wall of the body at the lower portion of said partition wall, said seat having means supporting it so that the space between said seat and said bottom wall will be in open communication with said compartment; supporting means secured to said body, enabling it to be moved along a supporting surface; and a handle means for the child's cart for use in moving it.

5. In a child's cart of the character described, the combination of: a body having a continuous flat bottom wall, a side wall structure extending upwardly therefrom so as to form a child's compartment, a wall defining an accessories chamber at one end of said compartment, and a dividing wall forming a partition between said compartment and said chamber the lower portion of said dividing wall being spaced above said bottom so that there is a space at the lower end of said accessories chamber in open communication with said compartment; a seat in said compartment spaced above said bottom wall of the body at the lower portion of said partition wall, said seat having means supporting it so that the space between said seat and said bottom wall will be in open communication with said compartment, and said means supporting said seat so that it may be moved into said space at the lower end of said accessories chamber; supporting means secured to said body, enabling it to be moved along a supporting surface; and a handle means for the child's cart for use in moving it.

CHESTER G. MALIN.

REFERENCES CITED

The following references are of record in the file of this patent:

UNITED STATES PATENTS

| Number | Name | Date |
| --- | --- | --- |
| 199,097 | Palmer | Jan. 8, 1878 |
| 706,854 | Schulze | Aug. 12, 1902 |
| 1,042,193 | Bowling | Oct. 22, 1912 |
| 1,212,243 | O'Hearn | Jan. 16, 1917 |
| 1,460,944 | Cameron | July 3, 1923 |
| 1,507,955 | Dann et al. | Sept. 9, 1924 |
| 1,842,159 | Fleishman et al. | Jan. 19, 1932 |
| 1,861,958 | Gallinant | June 7, 1932 |
| 1,973,352 | Michal | Sept. 11, 1934 |
| 2,254,786 | Snyder | Sept. 2, 1941 |
| 2,303,527 | Davidson | Dec. 1, 1942 |
| 2,362,186 | Brantz | Nov. 7, 1944 |

FOREIGN PATENTS

| Number | Country | Date |
| --- | --- | --- |
| 15,262 | Great Britain | July 9, 1896 |
| 175,113 | Great Britain | Feb. 16, 1922 |
| 219,543 | Great Britain | July 31, 1925 |
| 719,051 | France | Nov. 13, 1931 |